May 27, 1924.
D. W. PARKER
STONE SAWING MACHINE
Filed Aug. 11, 1921
1,495,430
3 Sheets-Sheet 1
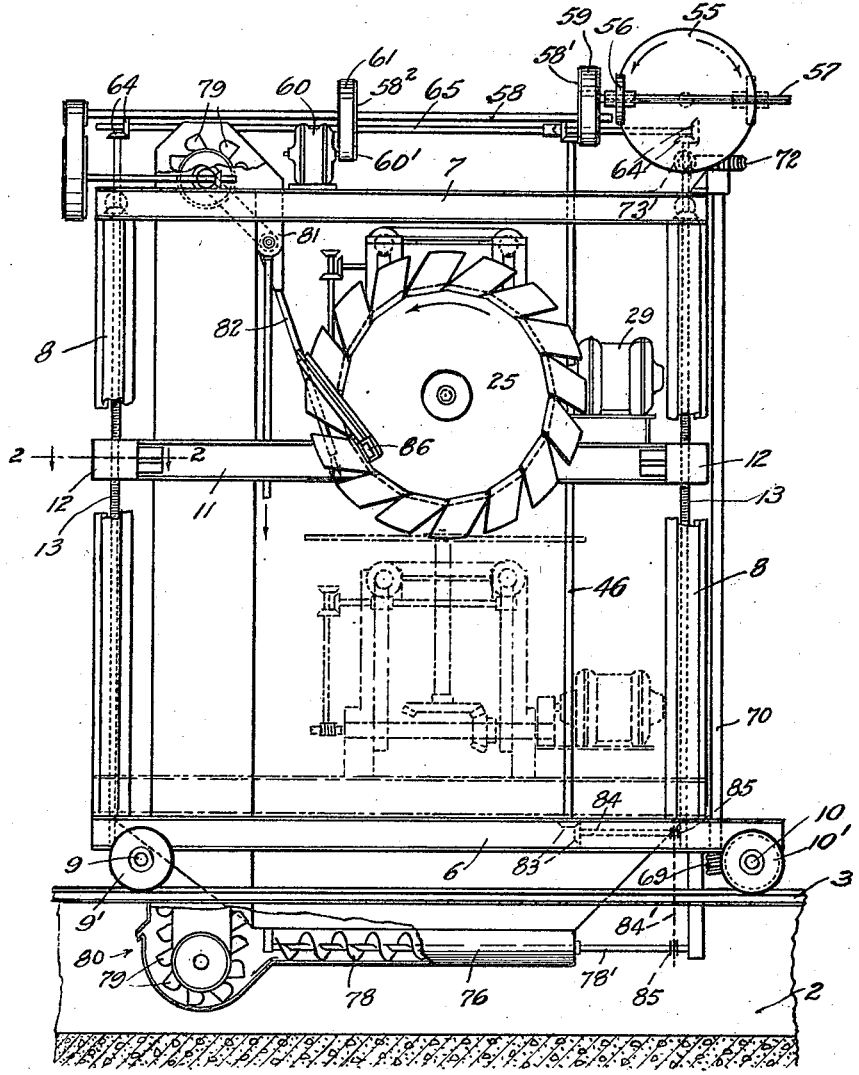
Fig. 1.
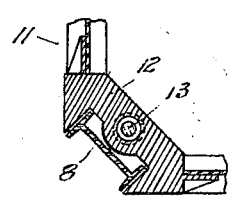
Fig. 2.
Fig. 8.
INVENTOR:
Daniel W. Parker
BY
Pierre Barnes
ATTORNEY May 27, 1924.

D. W. PARKER

STONE SAWING MACHINE

Filed Aug. 11, 1921

1,495,430

3 Sheets-Sheet 2

INVENTOR:
Daniel W. Parker.
BY
Pierre James
ATTORNEY

May 27, 1924.
D. W. PARKER
STONE SAWING MACHINE
Filed Aug. 11, 1921
1,495,430
3 Sheets-Sheet 3
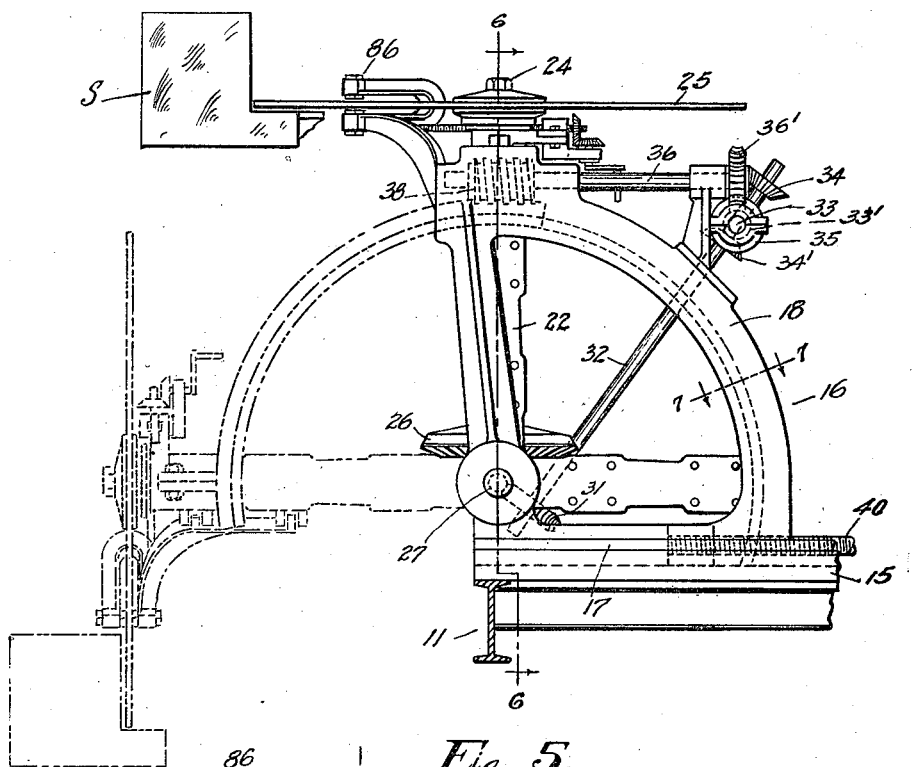
Fig. 5.
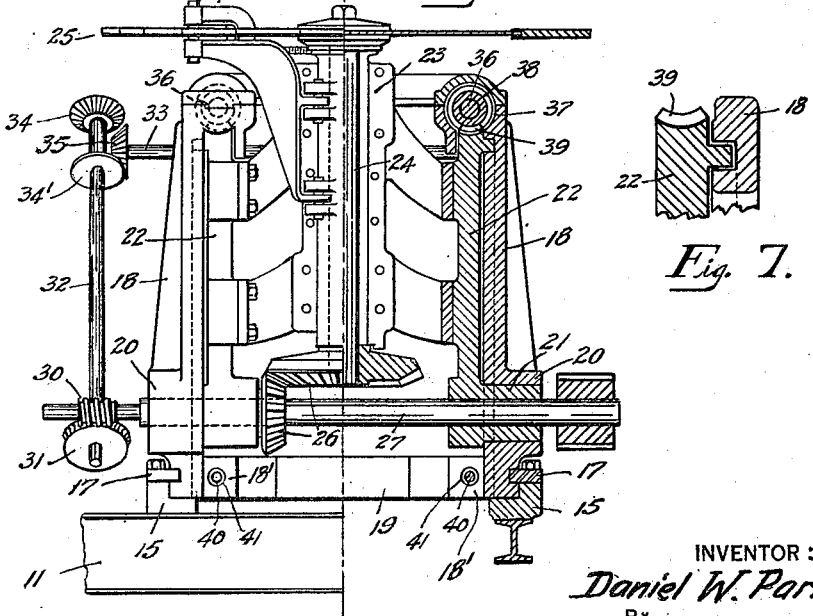
Fig. 6.
Fig. 7.
INVENTOR:
Daniel W. Parker
BY
Pierre Barnes
ATTORNEY Patented May 27, 1924.

1,495,430

UNITED STATES PATENT OFFICE.

DANIEL W. PARKER, OF EVERETT, WASHINGTON, ASSIGNOR TO THE PARKER ROTARY STONE SAW COMPANY, OF SAN FRANCISCO, CALIFORNIA, A CORPORATION OF NEVADA.

STONE-SAWING MACHINE.

Application filed August 11, 1921. Serial No. 491,337.

*To all whom it may concern:*

Be it known that I, DANIEL W. PARKER, a citizen of the United States, residing at Everett, in the county of Snohomish and State of Washington, have invented certain new and useful Improvements in Stone-Sawing Machines, of which the following is a specification.

This invention relates in general to machines for sawing stone and its object is to provide at moderate cost a machine of this character which may be operated economically and efficiently to cut stone blocks of small or large size into merchantable shapes. A further object is to provide a stone sawing machine by which saw cuts may be effected selectively in horizontal, vertical or inclined planes with a single setting of the work.

Other objects and advantages of the invention will appear in the following description.

The invention consists in the novel construction, adaptation and combination of parts hereinafter described, illustrated in the accompanying drawings and particularly set forth in the appended claims, it being understood that changes in the specific structure shown and described may be made without departing from the spirit of the invention.

In said drawings,—

Figure 3:
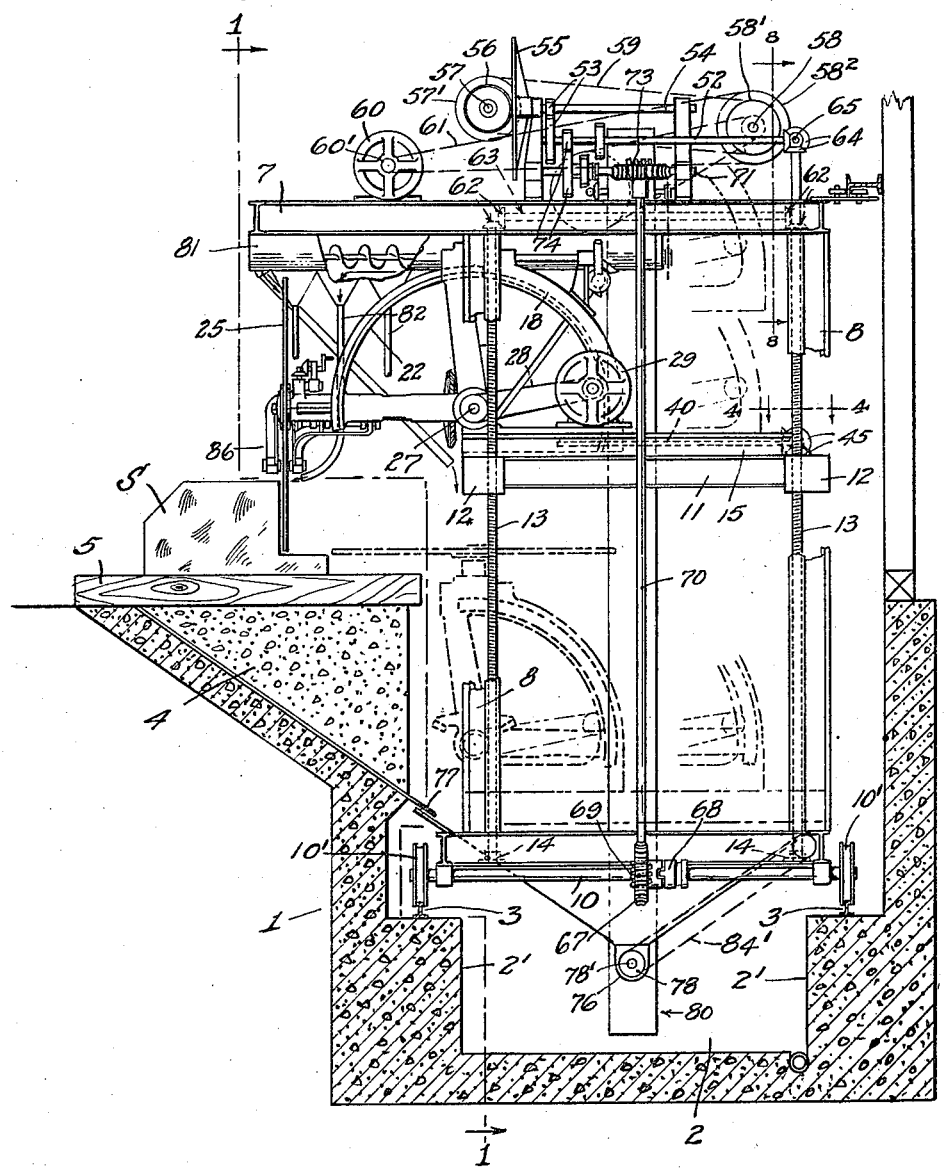
Figure 4:
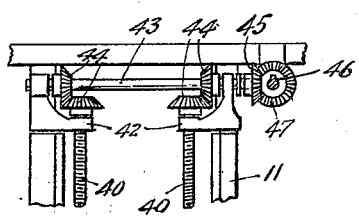

Figure 1 is a view, partly in side elevation and partly in longitudinal section, taken on broken line 1—1 of Fig. 3. Fig. 2 is a detail sectional view through 2—2 of Fig. 1. Fig. 3 is an end elevation of the machine with the foundation thereof shown in transverse vertical section. Fig. 4 is a detail plan view illustrating gear devices for regulating the positions of the saw at right angles to the direction of the carriage travel. Fig. 5 is an end elevational view to an enlarged scale of the stone sawing mechanism illustrating by full lines the saw in position for making a horizontal cut and by dotted lines the saw in position for making a vertical cut. Fig. 6 is a view partly in side elevation and partly in section of the devices shown in Fig. 5, said section being taken on line 6—6 thereof. Fig. 7 is a detail sectional view through 7—7 of Fig. 5 showing guiding means for the adjustable saw frame. Fig. 8 is detail sectional view taken substantially through 8—8 of Fig. 3.

In said drawings, the reference numeral 1 designates a foundation, desirably of concrete, having at pit 2 between side walls $2^1$ upon ledges of which are secured longitudinally disposed track rails 3.

At one side of the pit 2, said foundation is provided at a higher elevation than the track with a plurality of transverse partitions, such as 4, upon each of which is a skid 5 serving to support a block of stone S which is to be sawed by the machine.

The machine itself comprises a carriage frame having lower and upper rectangular frame members 6 and 7 rigidly connected with each other by corner posts 8.

Secured to the lower frame member 6 of the carriage are journal boxes for transverse axles 9 and 10 of wheels $9^1$ and $10^1$ which are mounted on said track rails to afford travel to the carriage.

Located between the carriage frame members 6 and 7 is an elevator platform 11 provided with recessed corner blocks 12 slidable on the respective posts 8.

For raising or lowering the platform 11 I provide vertical screws 13 mounted in step bearings 14 on the frame 6 and engaging in threaded holes provided in the respective corner blocks 12 of the platform.

Secured to said platform are transversely disposed rails 15 which are recessed to afford ways for the saw housing-frame indicated, generally, by 16 the latter being grooved at opposite sides to receive tongues which are provided by plates 17 (Fig. 6) secured to the rails 15 and act to prevent said housing-frame from tilting.

Said housing-frame comprises two vertically disposed arcuate shaped side members 18 which are coupled in spaced relations with each other by means of bars such as 19, Fig. 6.

Journaled in bearings 20 of said housing-frame are trunnions 21 protruding from substantially quadrant shaped side members 22 which are rigidly secured or formed integral with a central member 23 and constituting therewith the saw frame.

Journaled in the frame member 23 radially of the axis of the supporting trunnions 21 of said saw frame is an arbor 24 upon the outer end of which is mounted a circular saw 25. Said saw is rotated with its arbor through the medium of bevel tooth gears 26 from a shaft 27 extending axially through the frame trunnions 21 and is driven as by means of an endless belt 28 (Fig. 3) from a motor 29 which is secured to the housing frame 16.

Mounted on the shaft 27 (Fig. 6) is a worm 30 engaging a worm wheel 31 provided on an inclined intermediate shaft 32 which is operatively connected with a horizontal shaft 33 by a bevel gear wheel 34 or $34^1$ on the shaft 32 when one or the other of the wheels 34 or $34^1$ is brought into engaged relations with a bevel gear 35 provided on the shaft 33. The shaft 33 is disposed parallel with the shaft 27 and serves, upon occasion, to drive in either rotary direction, as determined by the positions of the gears 34 or $34^1$, two parallel shafts 36 which are disposed at right angles to the shaft 33.

The shafts 36 are each driven from the shaft 33 by means of a worm wheel $36^1$ and a worm $33^1$ on the respective shafts. Also mounted upon the shafts 36 and within a chamber, such as 37, Fig. 6, in the respective housing members 18 is a worm 38 engaging in teeth 39 provided in the arcuate edges of the side members 22 of the saw frame whereby the latter may be turned about the axis of its trunnion supports to regulate the plane in which it is desired to have the saw operate.

The saw frame and the housing is shifted in unison transversely of the carriage by means of twin screws 40 engaging in threaded holes 41 provided in lug elements $18^1$ of the housing members 18. The screws 40 are journaled in angle boxes 42 (Fig. 4) which also afford bearings for a horizontal shaft 43 with which the screws are operatively connected by pairs of bevel gears 44.

The shaft 43 is, in turn, releasably connected with a vertical shaft 46 by means of bevel gears 45 and 47, the former being axially shiftable on the shaft 43 to enable the shaft 46 to operate independently thereof and the gear 47 is splined to its shaft for vertical movements with the platform 11. As shown in Fig. 8, to the upper end of the shaft 46 has secured thereon a bevel gear 48 in mesh with a gear element 49 of a sleeve 50 which is rotated by means of bevel gears 51 from a horizontal shaft 52. The last named shaft is driven through the medium of spur gears 53 from a shaft 54 upon which is a disk 55 adapted to be frictionally driven in either rotary direction, selectively, by means of a pinion 56 which is shiftable axially upon a shaft 57 and diametrically with respect to said disk. The shaft 57 is driven from a counter shaft 58 by means of a belt 59 passing about pulleys $57^1$ and $58^1$ on the respective shafts, and the counter shaft is driven from a motor 60 as by means of an endless belt 61 passing about pulleys $58^2$ and $60^1$ on the counter shaft and armature shaft respectively. The upright screws 13 above referred to for raising and lowering the platform 11 are arranged to act in unison as by operatively coupling those at each end of the machine together through the medium of bevel gears 62 and shafts, such as 63 Fig. 3, which are disposed transversely of the machine.

The screws 13 at one side of the machine frame are, moreover, operatively coupled with each other by means of pairs of bevel gears 64 and a shaft 65 which latter, as shown in Fig. 8, extends through the sleeve 50 and to which it may be releasably connected by means of a clutch element $65^1$ splined to the shaft 65 and a clutch element $50^1$ of said sleeve.

The carriage is propelled to effect the feed or reverse travel of the saw by rotating the axle 10 through the medium of driving mechanism which as illustrated includes a worm wheel 67 rotatably mounted on said axle and releasably secured to the same by a clutch member 68 thereon engageable with a clutch element provided on the worm wheel. This worm wheel is rotated by a worm 69 on a vertical shaft 70 which is rotated from a horizontal shaft 71 through the medium of a worm-wheel 72 and a worm 73 on the respective shafts. The shaft 71 is rotated by spur 74 from the shaft 52. 76 represents a trough depending from the carriage to receive shot which is fed thereinto from aprons, such as 77 Fig. 3 provided between the adjacent partitions 4. Within the trough 76 is a screw 78 for conveying shot which is collected therein to the buckets 79 of an elevator 80 which serves to deliver the shot into a receiver 81 from which the shot is delivered into the kerf by a selected one of a series of delivery tubes 82.

The conveyer screw 78 and the elevator 80 are operated by suitable power transmission means from the motor 60 or otherwise.

For example, the motor driven shaft 46 may be utilized to drive through gears 83 a shaft 84 from which the screw shaft $78^1$ is driven by a chain $84^1$ and sprocket wheels 85. 86 represents a sawguide secured to the saw housing frame to be movable therewith to accommodate the various positions of the saw 25.

For operation, the work S is placed upon supporting skids 5 and the saw adjusted to be in a plane corresponding to that at which a cut is to be made, the platform 11 is then regulated to a suitable elevation by actuating screws 13, and the saw moved laterally with its frame by actuating the screws 40.

When the above mentioned parts are thus arranged, the carriage is set in motion by rotating the axle 10 as above explained.

During the operation the shot is repeatedly supplied to the work to serve as a stone abrading agent under the influence of the saw.

The construction and operation of the invention will, it is believed, be understood from the foregoing description.

What I claim, is,—

1. In a stone sawing machine, the combination of work supporting means, a carriage, a vertically movable platform thereon, a saw-frame carried upon said platform and adjustably movable at right angles to the direction of travel of said carriage, a saw having its arbor adjustably mounted in said saw-frame to vary the angle of the saw with respect to the work, means to drive the saw, and means to propel the carriage.

2. In a stone sawing machine, the combination of a carriage, means to propel the carriage, a platform carried by said carriage and arranged for vertical movements relative thereto, a saw frame mounted upon said platform for movements transversely to the direction of the travel of said carriage, a saw having its arbor mounted in said saw-frame and means to effect the vertical and transverse movements of the saw with respect to the saw-frame.

3. In a stone sawing machine, the combination with a carriage, a platform provided in said carriage for vertical movements, a saw, a saw-frame located upon said platform for horizontal movements relative thereto, means provided on said platform for driving the saw, means for effecting horizontal movements to said saw frame at right angles to the travel of said carriage, and power actuated means for raising and lowering the platform for regulating the elevation of said saw frame.

4. In a stone sawing machine, a carriage, means to propel the same, a platform therefor mounted on said carriage for vertical adjustments with respect thereto, a saw-frame upon said carriage, a saw having its arbor mounted in said saw-frame, means for regulating said saw-frame to locate the saw at a selected angle from the horizontal, and means for regulating said saw-frame for adjustably moving said saw horizontally into a selected cutting position.

5. In a stone sawing machine, a carriage, means to propel the same, a platform provided on said carriage for vertical adjustments, a saw-frame, means provided upon said platform for pivotally supporting said saw-frame, a saw mounted on the free end of said saw-frame, means for driving said saw, means for adjustably moving said saw-frame to locate said saw into predetermined vertical, horizontal and inclined positions, and means for horizontally moving said saw-frame with respect to said platform to cause the saw to be brought into and from cutting position.

Signed at Everett, Washington, this 30th day of July, 1921.

DANIEL W. PARKER.

Witnesses:
L. H. WRIGHT,
F. H. WRIGHT.